(12) United States Patent
Jacobs (10) Patent No.: US 8,769,290 B1
(45) Date of Patent: Jul. 1, 2014

(54) PROVIDING CONFIDENTIAL STRUCTURED DATA

(75) Inventor: Aaron Jacobs, Ashfield (AU)

(73) Assignee: Google Inc., Mountain View, CA (US)

( * ) Notice: Subject to any disclaimer, the term of this patent is extended or adjusted under 35 U.S.C. 154(b) by 394 days.

(21) Appl. No.: 13/036,833

(22) Filed: Feb. 28, 2011

(51) Int. Cl.
 *H04L 12/417* (2006.01)
 *H04L 9/32* (2006.01)

(52) U.S. Cl.
 CPC ............ *H04L 12/417* (2013.01); *H04L 9/3213* (2013.01)
 USPC ........... 713/172; 713/150; 713/175; 713/176; 726/3; 726/5; 726/9; 726/10

(58) Field of Classification Search
 CPC .............................. H04L 12/417; H04L 9/3213
 USPC ......... 726/3, 5, 9–10; 713/150, 172, 175–176
 See application file for complete search history.

(56) References Cited

U.S. PATENT DOCUMENTS

| | | | |
|---|---|---|---|
| 2004/0093515 A1* | 5/2004 | Reeves, Jr. | 713/201 |
| 2005/0066317 A1* | 3/2005 | Alda et al. | 717/136 |
| 2005/0114666 A1* | 5/2005 | Sudia | 713/175 |
| 2006/0045110 A1* | 3/2006 | Miura et al. | 370/408 |
| 2010/0250951 A1* | 9/2010 | Ueno et al. | 713/176 |

* cited by examiner

*Primary Examiner* — Venkat Perungavoor
*Assistant Examiner* — Amir Mehrmanesh
(74) *Attorney, Agent, or Firm* — Fish & Richardson P.C.

(57) ABSTRACT

Methods, systems, and apparatus, including computer programs encoded on a computer storage medium, for providing confidential structured data. In one aspect, a method includes creating a first data structure instance according to a protocol for creating structured and extensible data structures. The first data structure instance is serialized. The serialized first data structure instance is encrypted. A second data structure instance is created according to the protocol. The second data structure instance contains the encrypted and serialized first data structure instance. The second data structure instance is serialized.

19 Claims, 3 Drawing Sheets

PROVIDING CONFIDENTIAL STRUCTURED DATA

BACKGROUND

The present disclosure relates to providing confidential structured data.

A data structure defines a way of organizing data. A data structure instance is a collection of data organized according to a particular data structure. Data structure instances can be serialized. Serialization refers to converting a data structure instance, which typically exists in computer memory in a format particular to a certain development environment (e.g., as a Java object), into a sequence of bits. The sequence of bits may be written to a file or transmitted over a network.

Protocol buffers are one way to define data structures. Protocol buffers are a serialization format with an interface description language, and provide an automated mechanism for serialization and deserialization. A developer defines a data structure using protocol buffers by creating a protocol buffer message in a .proto file. The protocol buffer message contains name/value pairs that define the data structure. Protocol buffer messages are structured and extensible, so updating a protocol buffer message will not break deployed programs that rely on an earlier protocol buffer message.

SUMMARY

A computer system generates user request tokens and provides them to user devices. The system provides confidential structured data in the user request tokens. The system may use the user request tokens to verify that later requests for information from a user device are based on earlier requests from the user device. The system generates the user request tokens by serializing and encrypting data structure instances.

In general, one innovative aspect of the subject matter described in this specification can be embodied in methods that include the actions of generating a user request token, including: creating a first data structure instance according to a protocol for creating structured and extensible data structures, the first data structure instance containing first data; serializing the first data structure instance; encrypting the serialized first data structure instance; creating a second data structure instance according to the protocol, the second data structure instance containing the encrypted and serialized first data structure instance; and serializing the second data structure instance to generate the user request token; sending the user request token to a client device; and receiving the user request token from the client device and recovering the first data in the user request token. Other embodiments of this aspect include corresponding systems, apparatus, and computer programs, configured to perform the actions of the methods, encoded on computer storage devices.

These and other embodiments can optionally include one or more of the following features. Generating the user request token further comprises encoding the serialized second data structure instance into a plurality of text characters. Generating the user request token further comprises creating a digital signature using the first data structure and a private key and including the digital signature in the second data structure. Encrypting the serialized first data structure comprises using a symmetrical encryption algorithm, a private key, and an initialization vector; and wherein the second data structure includes the initialization vector. The initialization vector is a random initialization vector. The first data comprises one or more of: an internet protocol (IP) address for the client device and a time stamp. Recovering the first data in the token comprises: deserializing the second data structure and extracting the encrypted and serialized first data structure; decrypting the serialized first data structure; and deserializing the first data structure to recover the first data. The actions further comprise: receiving a first request from the client device; sending a plurality of responsive items to the client device in response to the first request; receiving, with the user request token, a second request for additional information regarding one of the responsive items; and determining whether to respond to the second request based on the user request token.

Particular embodiments of the invention can be implemented to realize one or more of the following advantages. Data can be provided to a user device as a token so that the user device cannot alter the token or counterfeit tokens. The token can include sensitive data that is encrypted and thus kept from the client device. The token is structured to facilitate serialization and extensible to facilitate the adding of more data in a backwards-compatible manner.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
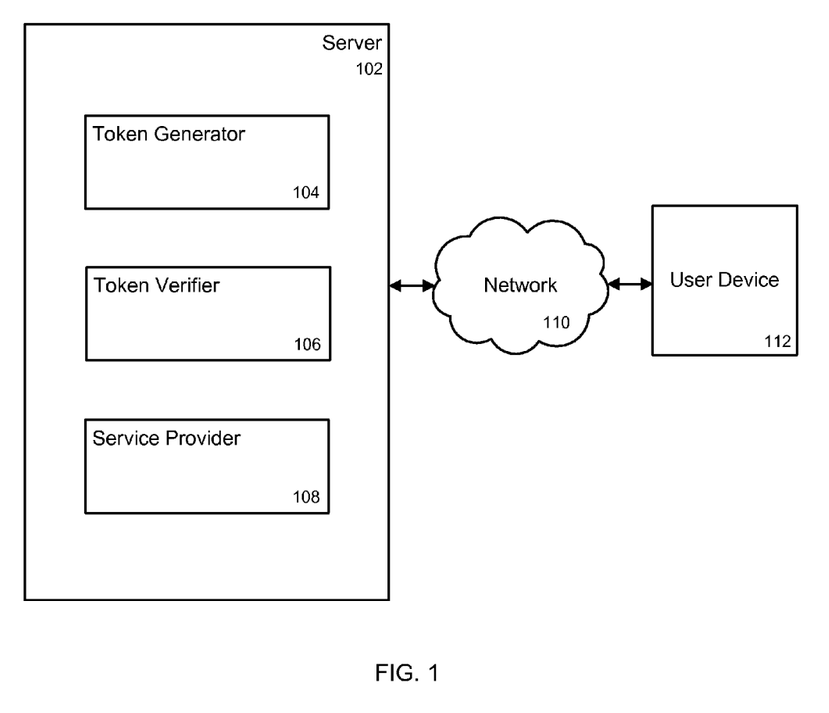
FIG. 1 is a block diagram of a server that provides confidential structured data to a user device.

FIG. 1 is a block diagram of a server 102 that provides confidential structured data to a user device 112. A network 110, e.g., the Internet, connects the user device 112 and the server 102.

The server 102 includes various modules 104, 106, and 108, e.g., executable software programs, that are executed by the server 102. As shown, the server 102 includes a token generator module 104 for generating user request tokens, a token verifier module 106 for verifying received tokens, and a service provider module 108 for providing a service to the user device 112. Each module runs, for example, as part of the operating system on the server 102, as an application on the server 102, or as part of the operating system and part of an application on the server 102.

Although several modules 104, 106, and 108 are illustrated, there may be fewer or more modules. Furthermore, although the implementations are described as modules, any type of software implementation may be used. Likewise although only one server 102 is shown, other implementations may include multiple data processing apparatus in data communication over the network 102, and the module functions described below may be distributed on one or more data processing apparatus.

The service provider 108 may be, for example, a search engine, an email service, a social networking service, an electronic mapping service, or the like. The user device 112 communicates with the server 102 to use the service provider 108, e.g., to receive search results, email, and the like.

The service provider 108 provides confidential structured data to the user device 112 using the token generator 104. The token generator 104 generates user request tokens, for example, using the process 200 illustrated in FIG. 2. The token generator 104 receives the data from the service provider 108, includes it in a token, and provides the token to the user device 112. When the user device 112 may later provide the token back to the server 102, and the token verifier 106 verifies the token. For example, the token verifier may reverse the process 200 illustrated in FIG. 2.

Figure 2:
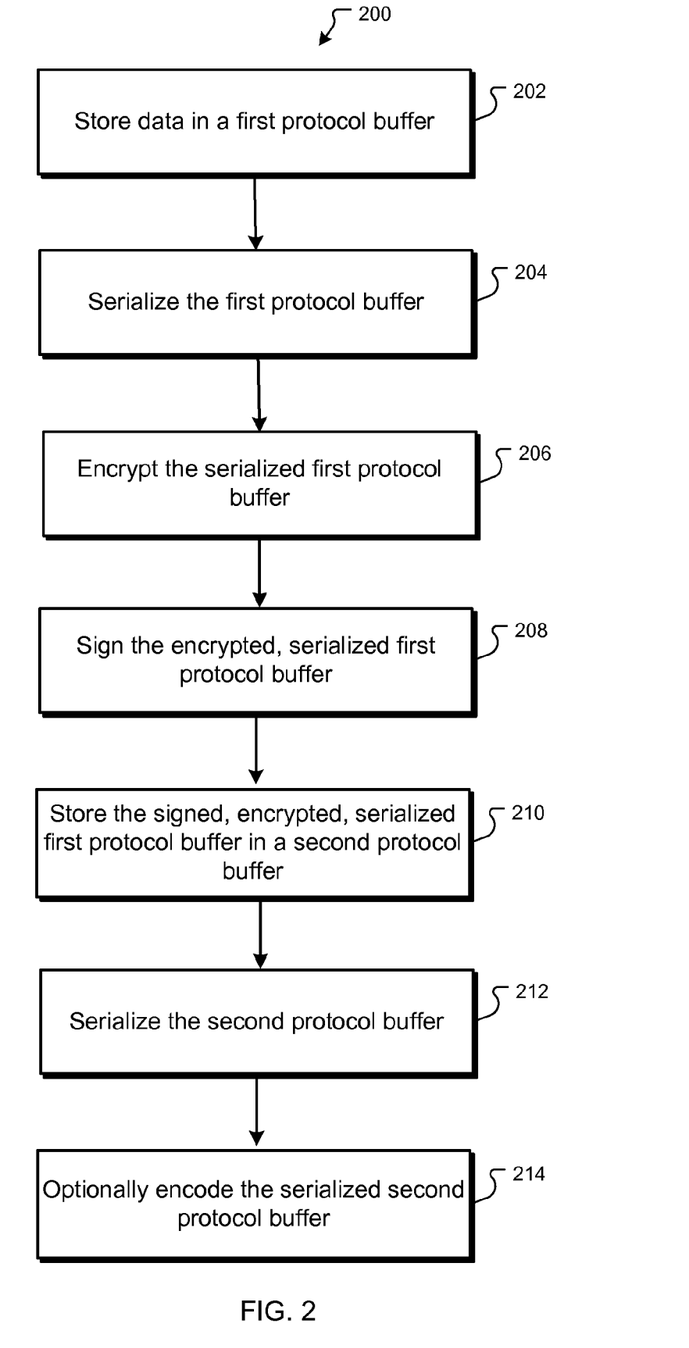
FIG. 2 is a flow diagram of a process for generating a user request token.

FIG. 2 is a flow diagram of a process 200 for providing confidential structured data. For example, the process 200 may be used to create user request tokens. The process may be performed by a system of one or more computers, for example, the server 102 of FIG. 1 executing the token generator 104. For purposes of illustration, the process 200 will be described with respect to a system that performs the process.

The system stores data in a first protocol buffer (step 202). The data may be, for example, data from a service provider (e.g., the service provider 108 of FIG. 1). The data may include, for example, a reference to an entity (e.g., a business name), an expiration time, a user identifier, an Internet Protocol (IP) address, or the like. The first protocol buffer is an instance of a protocol buffer message designed to hold at least the data.

The system serializes the first protocol buffer (step 204). For example, the system may use the serialization features of protocol buffers.

The system encrypts the serialized first protocol buffer (step 206). For example, the system may encrypt the serialized first protocol buffer using a symmetrical encryption algorithm, e.g., the Advanced Encryption Standard (AES). In some implementations, the system encrypts the serialized first protocol buffer with a private key (e.g., an AES-128 key) and an initialization vector. The initialization vector may include one or more random numbers. The system may keep the AES-128 key private but use it to generate user request tokens for various user devices. In some implementations, the system retains the initialization vector so that it can verify the user request token. In some other implementations, the system discards the initialization vector after storing it in a second protocol buffer (as described below with respect to step 210).

The system signs the encrypted, serialized first protocol buffer (step 208) by creating a digital signature using the first data structure. For example, the system may sign the encrypted, serialized first protocol buffer using a Hash-based Message Authentication Code (HMAC). In some implementations, the system signs the encrypted, serialized first protocol buffer with a private key (e.g., a HMAC-SHA1 key). The system may keep the key private but use it to sign user request tokes for various user devices.

The system stores the signed, encrypted, serialized first protocol buffer in a second protocol buffer (step 210). In some implementations, where the system uses an initialization vector to encrypt the serialized first protocol buffer, the system includes the initialization vector in the second protocol buffer. The second protocol buffer may be the same type of protocol buffer as the first protocol buffer or a different type of protocol buffer. For example, the second protocol buffer may be an instance of a protocol buffer message designed to hold: an encrypted, serialized protocol buffer; an initialization vector, and a digital signature.

The system serializes the second protocol buffer (step 212). For example, the system may use the serialization features of protocol buffers.

In some implementations, the system encodes the serialized second protocol buffer. For example, the system may Base64 encoding scheme to create a textual representation of the serialized second protocol buffer. Encoding the serialized second protocol buffer is useful, for example, so that the system can send the user request token using Hypertext Transfer Protocol (HTTP).

The process 200 is described using protocol buffers. However, the system may perform the process 200 using other types of structured and extensible data structures. In general, the system creates data structure instances according to a protocol for creating structured and extensible data structures. For example, the first protocol buffer may be a first data structure instance created according to the protocol, and the second protocol buffer may be a second data structure instance created according to the protocol.

The system may reverse the process 200 to recover the data stored in the first protocol buffer. For example, the system may deserialize the second protocol buffer and extract the encrypted and serialized first protocol buffer. The system then decrypts the serialized first protocol buffer and deserializes the first protocol buffer to recover the data.

Figure 3:
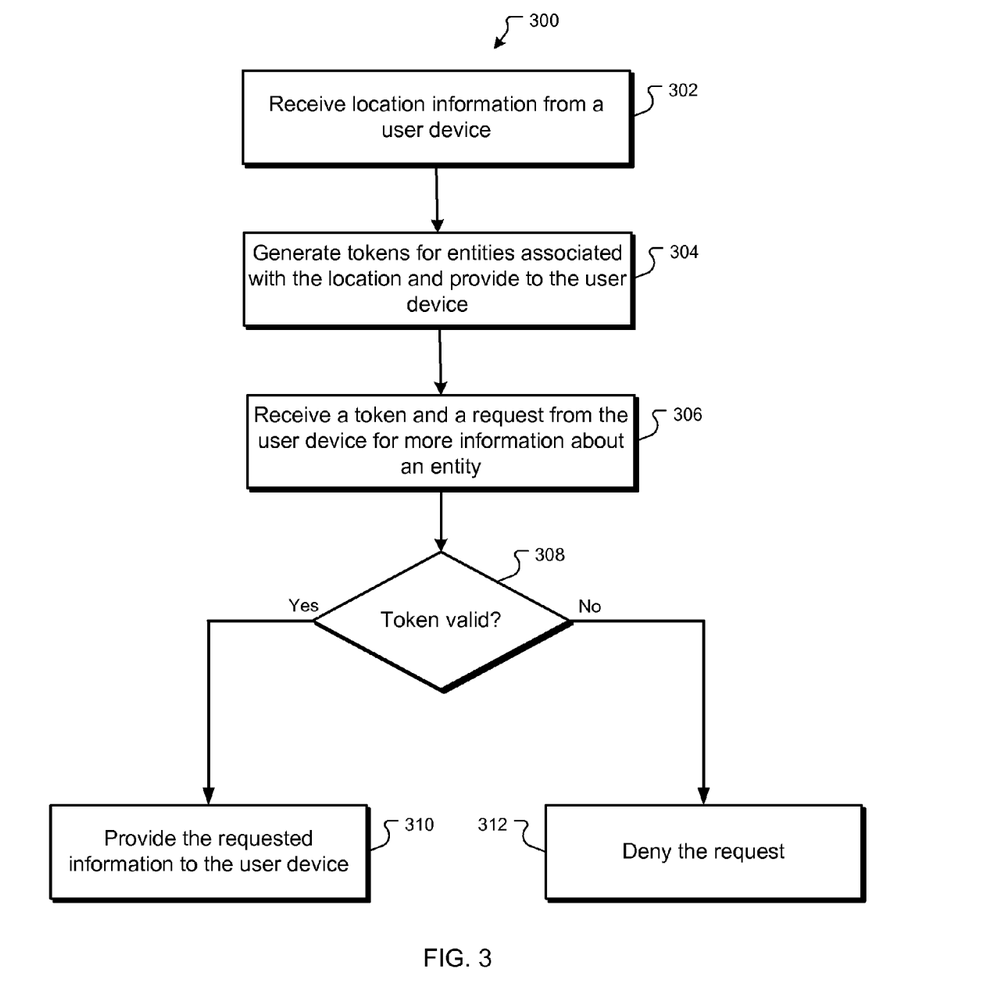
FIG. 3 is a flow diagram of a process for providing location-based information using user request tokens.

FIG. 3 is a flow diagram of a process 300 for providing location-based information using user request tokens. The process may be performed by a system of one or more computers, for example, the server 102 of FIG. 1 executing the service provider 108 of FIG. 1. For purposes of illustration, the process 300 will be described with respect to a system that performs the process.

The system performs the process 300 in the context of providing information regarding entities (e.g., businesses, organizations, restaurants, and so on) associated with locations. For example, the system may receive location information from a user device and provide a list of names of businesses near a location specified by the location information. The user device then requests additional information (e.g., operating hours, stock quotes, prices, and so on) about a specific business in the list of businesses. The system provides the additional information.

To encourage users to use the system, the system may only provide additional information to users who made an initial request (e.g., for a list of businesses near a location). To do so, the system verifies that requests for additional information follow after initial requests. The system performs the process 300 and provides user request tokens to require users to first obtain the list of businesses from the system before providing users with additional information. This is also useful, for example, to prevent abusive users from copying the additional information stored on the system with a series of repeated requests.

The system receives location information from a user device (step 302). The location information specifies a location. For example, the system may receive Global Positioning System (GPS) coordinates or an address from a user's mobile device. The location may be a user's current location or a location that user is interested in.

The system generates tokens for entities associated with the location and provides the tokens to the user device (step 304). The system may perform the process 200 illustrated in FIG. 2 to generate the tokens.

For example, the system may determine a list of entities having addresses within a certain distance of the location. The system generates a token for each entity. For example, each token may include a name and an address of an entity. The system may also provide the name and address of the entity along with the token since the user device will generally be unable to recover that information from the token.

The system receives a token and a request from the user device for more information about an entity (step 306). For example, the request may include the name of an entity and the token received for that entity including the name of the entity. The request may specify particular information, for example, a telephone number.

The system determines whether the token is valid (step 308). For example, the system may reverse the process 200 illustrated in FIG. 2. The system may determine that the token is valid, for example, if the signature of the token is valid and an entity name in the token matches an entity name received with the token, or if a time limit in the token has not been reached. If the token is valid, the system provides the requested information to the user device (step 310). If the token is not valid, the system denies the request (step 312).

The system therefore does not need to retain information specifying what user devices requested what information to ensure that user devices are only provided additional information after an initial request. Instead, the system may provide tokens and then discard specific user information.

For situations in which the systems discussed here collect personal information (e.g., location information) about users, the users may be provided with an opportunity to opt in/out of programs or features that may collect the personal information. In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user. A user's geographic location may be generalized where location information is obtained (such as to a city, zip code, or state level), so that a particular location of a user cannot be determined.

The process 300 is described with respect to a service that provides information regarding entities associated with a location. However, the system may perform the process 300 in other contexts as described above with reference to FIG. 1. For example, consider a system that provides email. The system may provide a list of email messages for a user to a user device. The system provides a token for each message, e.g., each token including a subject line of a message. The user device then returns a token to request the full text of a specific message, and the system verifies the token to determine that it provided the initial list of messages.

In general, the system receives a first request from a client device and sends responsive items (e.g., business names, email messages, and so on) to the client device. The system sends a user request token for each responsive item. The system then receives a second request for additional information (e.g., business hours, full text of an email, and so on) regarding one of the responsive items. The system also receives a user request token and determines whether to respond to the second request based on the user request token (e.g., the system determines to respond if it successfully verifies a user request token).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising one or more computers configured to perform operations comprising:
   receiving a first request from a client device;
   generating a user request token, including:
      creating a first data structure instance according to a protocol for creating structured and extensible data structures, the first data structure instance containing first data;
      serializing the first data structure instance;
      encrypting the serialized first data structure instance;
      creating a second data structure instance according to the protocol, the second data structure instance containing the encrypted and serialized first data structure instance; and
      serializing the second data structure instance to generate the user request token;
   sending a plurality of responsive items to the client device in response to the first request;
   sending the user request token to the client device; and
   receiving the user request token from the client device and recovering the first data in the user request token, including:
      receiving, with the user request token, a second request for additional information regarding one of the responsive items; and
      determining whether to respond to the second request based on the user request token.

2. The system of claim 1, wherein generating the user request token further comprises encoding the serialized second data structure instance into a plurality of text characters.

3. The system of claim 1, wherein generating the user request token further comprises creating a digital signature using the first data structure and a private key and including the digital signature in the second data structure.

4. The system of claim 1, wherein encrypting the serialized first data structure comprises using a symmetrical encryption algorithm, a private key, and an initialization vector; and wherein the second data structure includes the initialization vector.

5. The system of claim 4, wherein the initialization vector is a random initialization vector.

6. The system of claim 1, wherein the first data comprises one or more of: an internet protocol (IP) address for the client device and a time stamp.

7. The system of claim 1, wherein recovering the first data in the token comprises:
  deserializing the second data structure and extracting the encrypted and serialized first data structure;
  decrypting the serialized first data structure; and
  deserializing the first data structure to recover the first data.

8. The system of claim 1,
  wherein generating the user request token comprises generating the user request token in response to the first request, and wherein sending a plurality of responsive items to the client device in response to the first request comprises sending the user request token with the plurality of responsive items.

9. The system of claim 8, wherein:
  generating the user request token comprises generating, for each of the first plurality of items, a respective item token; and
  determining whether to respond to the second request comprises determining whether the user request token is valid with respect to the one of the responsive items in the second request for additional information.

10. A method performed by data processing apparatus, the method comprising:
  receiving a first request from a client device;
  generating a user request token, including:
    creating a first data structure instance according to a protocol for creating structured and extensible data structures, the first data structure instance containing first data;
    serializing the first data structure instance;
    encrypting the serialized first data structure instance;
    creating a second data structure instance according to the protocol, the second data structure instance containing the encrypted and serialized first data structure instance; and
    serializing the second data structure instance to generate the user request token;
  sending a plurality of responsive items to the client device in response to the first request;
  sending the user request token to the client device; and
  receiving the user request token from the client device and recovering the first data in the user request token, including:
    receiving, with the user request token, a second request for additional information regarding one of the responsive items; and
    determining whether to respond to the second request based on the user request token.

11. The method of claim 10, wherein generating the user request token further comprises encoding the serialized second data structure instance into a plurality of text characters.

12. The method of claim 10, wherein generating the user request token further comprises creating a digital signature using the first data structure and a private key and including the digital signature in the second data structure.

13. The method of claim 10, wherein encrypting the serialized first data structure comprises using a symmetrical encryption algorithm, a private key, and an initialization vector; and wherein the second data structure includes the initialization vector.

14. The method of claim 13, wherein the initialization vector is a random initialization vector.

15. The method of claim 10, wherein the first data comprises one or more of: an internet protocol (IP) address for the client device and a time stamp.

16. The method of claim 10, wherein recovering the first data in the token comprises:
  deserializing the second data structure and extracting the encrypted and serialized first data structure;
  decrypting the serialized first data structure; and
  deserializing the first data structure to recover the first data.

17. The method of claim 10,
  wherein generating the user request token comprises generating the user request token in response to the first request, and wherein sending a plurality of responsive items to the client device in response to the first request comprises sending the user request token with the plurality of responsive items.

18. The method of claim 17, wherein:
  generating the user request token comprises generating, for each of the first plurality of items, a respective item token; and
  determining whether to respond to the second request comprises determining whether the user request token is valid with respect to the one of the responsive items in the second request for additional information.

19. A computer storage medium encoded with a computer program, the program comprising instructions that when executed by data processing apparatus cause the data processing apparatus to perform operations comprising:
  receiving a first request from a client device;
  generating a user request token, including:
    creating a first data structure instance according to a protocol for creating structured and extensible data structures, the first data structure instance containing first data;
    serializing the first data structure instance;
    encrypting the serialized first data structure instance;
    creating a second data structure instance according to the protocol, the second data structure instance containing the encrypted and serialized first data structure instance; and
    serializing the second data structure instance to generate the user request token;
  sending a plurality of responsive items to the client device in response to the first request;
  sending the user request token to the client device; and
  receiving the user request token from the client device and recovering the first data in the user request token, including
    receiving, with the user request token, a second request for additional information regarding one of the responsive items; and determining whether to respond to the second request based on the user request token.

\* \* \* \* \*

UNITED STATES PATENT AND TRADEMARK OFFICE
CERTIFICATE OF CORRECTION

| | |
|---|---|
| PATENT NO. | : 8,769,290 B1 |
| APPLICATION NO. | : 13/036833 |
| DATED | : July 1, 2014 |
| INVENTOR(S) | : Aaron Jacobs |

Page 1 of 1

It is certified that error appears in the above-identified patent and that said Letters Patent is hereby corrected as shown below:

In the Claims

Column 10, Lines 63-64, Claim 19, delete "including" and insert --including:--.

Signed and Sealed this
Twenty-first Day of October, 2014

Michelle K. Lee
*Deputy Director of the United States Patent and Trademark Office*